(12) United States Patent
Caulfield (10) Patent No.: US 9,357,395 B1
(45) Date of Patent: May 31, 2016

(54) PROTECTING NON-INFORMING INCUMBENT SPECTRUM OPERATIONS

(71) Applicant: Jesse M Caulfield, McLean, VA (US)

(72) Inventor: Jesse M Caulfield, McLean, VA (US)

( * ) Notice: Subject to any disclaimer, the term of this patent is extended or adjusted under 35 U.S.C. 154(b) by 0 days.

(21) Appl. No.: 14/715,626

(22) Filed: May 19, 2015

(51) Int. Cl.
| | |
|---|---|
| *H04M 1/66* | (2006.01) |
| *H04M 1/68* | (2006.01) |
| *H04M 3/16* | (2006.01) |
| *H04W 12/08* | (2009.01) |
| *H04W 4/02* | (2009.01) |
| *H04W 16/14* | (2009.01) |

(52) U.S. Cl.
CPC .............. *H04W 12/08* (2013.01); *H04W 4/021* (2013.01); *H04W 16/14* (2013.01)

(58) Field of Classification Search
CPC ..... H04W 12/06; H04W 28/06; H04W 28/16; H04W 40/02
USPC .............. 455/411, 39, 452.2, 501, 454, 41.2, 455/513, 509, 16, 41.1, 449; 370/329, 338
See application file for complete search history.

(56) References Cited

U.S. PATENT DOCUMENTS

| | | | | |
|---|---|---|---|---|
| 2006/0234638 | A1* | 10/2006 | Mueckenheim | H04B 17/20 455/67.11 |
| 2009/0153354 | A1* | 6/2009 | Daussin | E21B 47/12 340/853.1 |
| 2009/0257412 | A1* | 10/2009 | Kuokkanen | H04W 12/08 370/338 |
| 2010/0008338 | A1* | 1/2010 | Tsfati | H04B 1/006 370/338 |

* cited by examiner

*Primary Examiner* — Joseph Arevalo (57) ABSTRACT

A Environmental Sensing Capability (ESC) is provided that facilitates the protection of a non-informing incumbent spectrum user in a dynamic spectrum sharing environment. The ESC, which consists of a plurality of spectrum sensors, may establish a geographic partitioning strategy within which each partitioned geographic service area may be individually managed according to a finite state machine. Incumbent users may receive radio frequency interference protection without disclosing the details of their spectrum operations.

6 Claims, 10 Drawing Sheets

PRIOR ART

PROTECTING NON-INFORMING INCUMBENT SPECTRUM OPERATIONS

CROSS-REFERENCE TO RELATED APPLICATIONS

Not Applicable.

FIELD OF THE INVENTION

The present invention relates generally to spectrum access and administration systems and more particularly to protecting the spectrum operations of a non-informing incumbent user.

BACKGROUND OF THE INVENTION

In the United States the Federal Communications Commission (FCC) and National Telecommunications and Information Administration (NTIA) jointly regulate the civilian and non-civilian use of radio frequency bands of the electromagnetic spectrum, respectively. An aspect of radio frequency regulation is to declare which type of user shall receive exclusive or priority access to a frequency band and among co-equal users which type of wireless service shall be prioritized. This process is called allocation and through it a hierarchy of primary and subordinate (e.g. secondary) users and services is established.

In a given radio frequency band civilian use may be allocated primary over non-civilian use, which would be allocated secondary. In another frequency band allocation non-civilian use may be primary over civilian use; in yet another band both uses may declared co-primary, and so forth. For example, in the 219-220 MHz band civilian use is allocated primary and among civilian users fixed and mobile land radio service is allocated primary while amateur radio service is declared secondary.

In the United States, radio frequency band allocation is negotiated between the NTIA and FCC. In other countries the national telecommunications regulator typically maintains a similar responsibility.

In a wireless communications system an Incumbent User (IU) is generally defined as either a user having primary status over another (e.g. secondary) user or, in the case of co-primary users, a wireless service type having primary status over another (e.g. secondary) service having. It may also occur in certain frequency bands that additional levels of prioritization are established by the regulator, such as, for example, a tertiary, quaternary, quinary, etc. user or service.

A regulator may undertake to reallocate a radio frequency band from time to time to allow co-primary use between civilian and non-civilian users or to allow civilian secondary use of a band in which civilian use was previously prohibited. When such a reallocation occurs it may develop over time where the introduced secondary users grossly outnumber the incumbent users and a spectrum sharing authority is required to coordinate spectrum sharing and to protect the incumbent service from radio frequency interference (RFI) from secondary users. Occasionally, and more frequently in recent years, a plurality of privately operated Spectrum Access Systems (SAS) may be designated by a regulator to operate as a spectrum sharing authority.

In certain circumstances a non-civilian incumbent user does not or may not inform the SAS about its spectrum operations. In this case the SAS may be supplemented by a separate Environmental Sensing Capability (ESC) that detects the incumbent user. In this context the term "Environmental Sensing Capability" (and abbreviated to ESC) means a distributed system of radio frequency sensors and the term "ESC" is therefore not used as a generic capability to detect but rather as the actual system doing the detection.

As an example, this is precisely the case in the 3,500-3,750 MHz frequency band where the allocated primary user is the U.S. Military, which is a non-informing incumbent whose spectrum operations are non-public and subject to security constraints.

Accordingly, there is a need to detect and also to protect non-informing incumbent users in a manner that satisfies the incumbent user's operational security and information security requirements.

BRIEF SUMMARY OF THE INVENTION

A method is provided to protect the spectrum operations of a non-informing incumbent spectrum user in a manner that obscures the details of the incumbent user's spectrum operation.

BRIEF DESCRIPTION OF THE DRAWINGS

Many aspects of the present disclosure can be better understood with reference to the following drawings. The drawings serve to further illustrate various embodiments and to explain various principles and advantages of the present invention. The components in the drawings are not necessarily to scale, emphasis instead being placed upon clearly illustrating the principles of the disclosure.

DETAILED DESCRIPTION OF A PREFERRED EMBODIMENT

As will be demonstrated by the various provided examples the effective implementation of a spectrum sharing strategy where the incumbent user is non-informing will benefit from and may require a ESC method and implementation that effectively protects the non-informing incumbent user while also obscuring information about the non-informing incumbent user's spectrum operations.

This disclosure describes a novel method for facilitating spectrum sharing in an environment where information about the non-informing incumbent spectrum user is privileged, proprietary or secret. The invention described herein protects a non-informing incumbent spectrum user and the information about that user by assigning responsibility to establish protection of non-informing incumbents to a ESC and responsibility to implement the established protection to a SAS. A ESC may then cause the non-informing incumbent to receive RFI protection without requiring to disclose detailed information about the detected spectrum operation to the SAS.

Delegating responsibility for establishing protection of non-informing incumbents to the ESC benefits from the ESC's ability to operate under a different information security domain and a correspondingly different and more private information security profile that a SAS whose operations and information security profile are expected to be more public-facing.

Within the ESC a protection strategy is described that includes partitioning a geographic region into a plurality of regular areas, detecting a non-informing incumbent spectrum user, and selectively causing various areas to be made unavailable for use by non-incumbent spectrum users according to geographic calculations that include a protected contour drawn around the incumbent user. In the described ESC protection strategy information about the detected non-informing incumbent user's spectrum operations, including for example its immediate location, operating frequency or frequencies, the time of detection, etc. may be independently and variably obscured.

The disclosure and various features and advantageous details thereof are explained more fully with reference to the exemplary embodiments illustrated in the accompanying drawings and detailed in the following description. Descriptions of known programming techniques, computer software, hardware, operating platforms and protocols may be omitted so as not to unnecessarily obscure the disclosure in detail. The detailed description and the specific examples, while indicating the preferred embodiments, are given by way of illustration only and not by way of limitation. Various substitutions, modifications, additions and/or rearrangements within the spirit and/or scope of the underlying invention will become apparent to those skilled in the art from this disclosure.

The provided examples are furthermore not intended as restrictions or limits to terms with which they are utilized. Instead the examples or illustrations are intended to describe a particular embodiment for illustrative purposes. Those of ordinary skill in the art will appreciate how the provided examples or illustrations encompass other embodiments and such embodiments are intended to be included within the scope of this invention.

Figure 1:
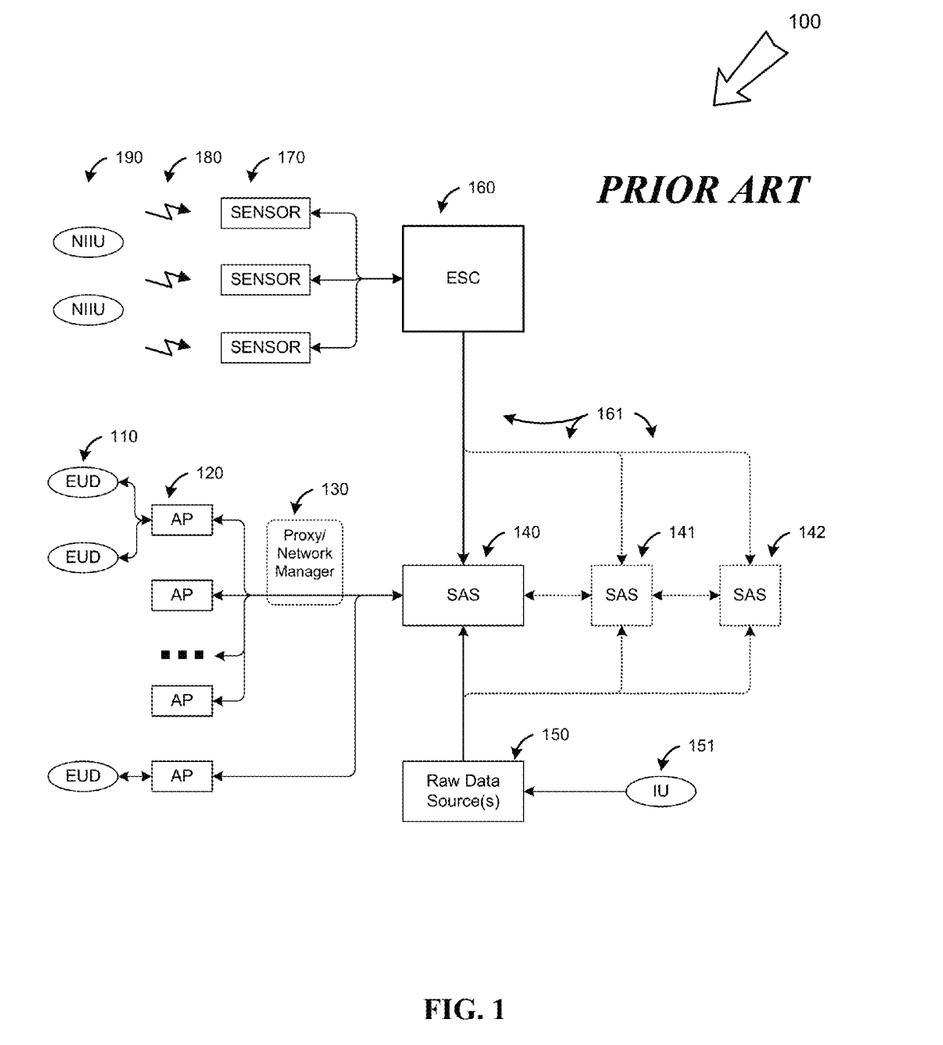
FIG. 1 is an exemplary diagram of a ESC supporting of a plurality of SAS instances.

Referring to FIG. 1 a known concept for a spectrum sharing configuration 100 is shown that incorporates one or more Spectrum Access System (SAS) 140 and a separate Environmental Sensing Capability (ESC) 160. While not shown in the concept diagram it is commonly understood that there may also exist a plurality of ESC implementations.

In a known spectrum sharing configuration 100 one or more SAS implementations 140, 141, 142, etc. may be designated by a regulator as a spectrum sharing authority for a frequency band. Each SAS instance may receive and processes various raw data 150 from a variety of sources, including the regulator, that includes information sufficient to implement protection of various informing incumbent users (IU) 151 but not sufficient to protect various non-informing IU 190.

A End User Device (EUD) 110 may receive wireless service from a plurality of fixed, mobile or transportable Access Point devices (AP) 120 that receives a radio frequency allocation or assignment from a SAS 140. EUD 110 and AP 120 devices may employ various wireless technologies and protocols, such as, for example, WiFi, WiMAX, LTE, etc. to exploit their radio frequency allocation or assignment from a SAS. For convenience and to facilitate network scalability a plurality of AP radio frequency allocation or assignment transactions may be aggregated through an optional intermediate Proxy or Network Manager apparatus 130.

In a known implementation 100 responsibility for protecting all IU, informing and non-informing, may be delegated by the regulator to one or more SAS 140, 141, 142, etc. and the corresponding implemented functionality resides within each respective SAS implementation. Specifically: the purpose of the SAS is expected to enable wireless EUD 100 and AP 120 devices to gain access to spectrum on a subordinate (e.g. secondary) basis to the various Incumbent Users (IU); to protect those various IU from radio frequency interference (RFI) from the subordinate users, and also to facilitate frequency coordination among the various subordinate users to more efficiently exploit the spectrum of a given frequency band.

In a known implementation 100 responsibility for detecting a non-informing IU resides within a ESC 160. Specifically: the purpose of a ESC is expected to detect the presence of a non-informing IU and to provide information about the detected non-informing IU to the SAS so that the SAS may execute its described responsibilities.

Described ESC configurations may consist of a plurality of centralized servers 160 tasked with data collection, data storage, data processing, etc. and a geographically distributed configuration of multiple and various spectrum sensing devices 170, such as, for example, spectrum analyzers, radio frequency tuners, etc. that are each configured to detect and identify the radio frequency emissions 180 of a plurality non-informing IU 190. A variety of ESC configurations are known and described, including, for example, a centralized management and messaging capability 160 with data collection, storage, processing, etc. functions distributed into the various spectrum sensing devices 170, among others.

The one or more SAS implementations 140, 141, 142, etc. may be configured to communicate with a ESC 160 to receive information about the detected non-informing IU 190 using a communications protocol 161, the information being sufficient for the SAS to implement RFI protection of each respective non-informing IU 190.

The current invention extends the known implementation 100 in a novel and unique manner by first partitioning the non-informing IU protection responsibilities of the SAS 140, delegating to the ESC 160 a responsibility to establish the effective protection of a non-informing IU 190, preserving the implementation of that protection within the SAS 140, and communicating information 170 between the ESC and SAS in a manner that limits the amount of IU information exchanged.

Figure 2:
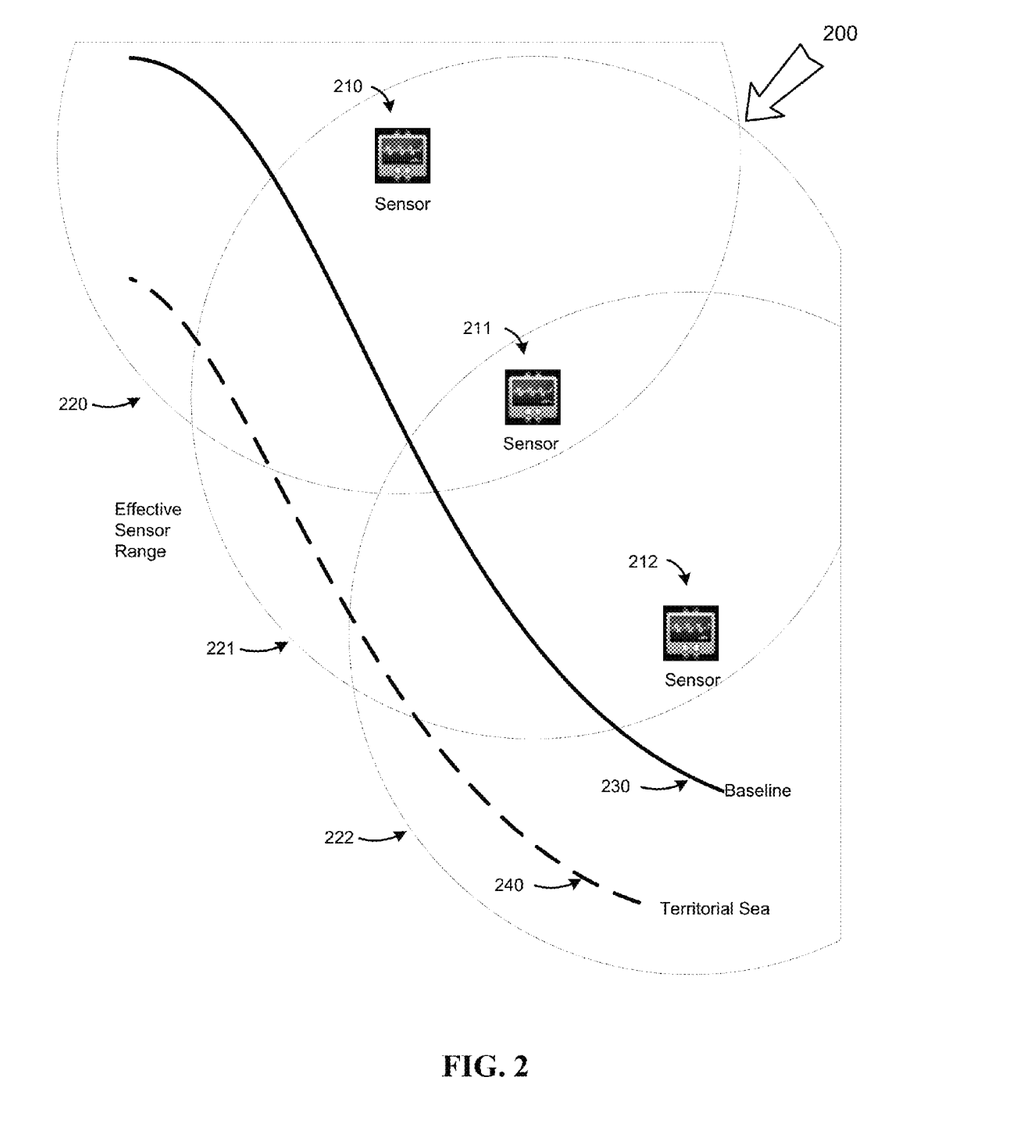
FIG. 2 depicts an envisioned ESC implementation configuration.

In FIG. 2 a example ESC configuration is shown. It is well known that a national regulator's authority may extend to the sovereign boundaries of the regulator's jurisdiction. Over land the jurisdiction may extend to the national border and along coastal regions the sovereign boundary is typically the Territorial Sea 240, a boundary located twelve nautical miles from the Baseline 230, which is defined as the low-water line along the coast. Accordingly, the geographic region within which a SAS may provide spectrum administration services may also be limited to the sovereign boundary of the country within which the SAS is operating. The SAS authorized service region is relevant to the configuration of a ESC.

Known ESC configurations envision a plurality of geographically dispersed spectrum sensors configured to detect IU spectrum operations and optionally to geo-locate the IU. A variety of IU transmitter geo-location techniques are also known and may be employed within the various ESC sensors.

In an envisioned and preferred embodiment of the invention 200 a plurality of ESC spectrum sensor devices 210, 211, 212, etc. are deployed along a nation's coastal region 230 such that their respective effective sensor ranges 220, 221, 222, etc. are configured purposefully to overlap in such a manner as to create a continuous and uninterrupted detection and geo-location capability that includes the SAS host nation's sovereign boundary (e.g. Territorial Sea) 240. Various strategies for implementing such a ESC configuration may include, for example, adjusting the various sensor's receiving sensitivity, strategically locating the various sensor installations, and employing directional antenna to shape the various effective sensor range geometries.

Figure 3:
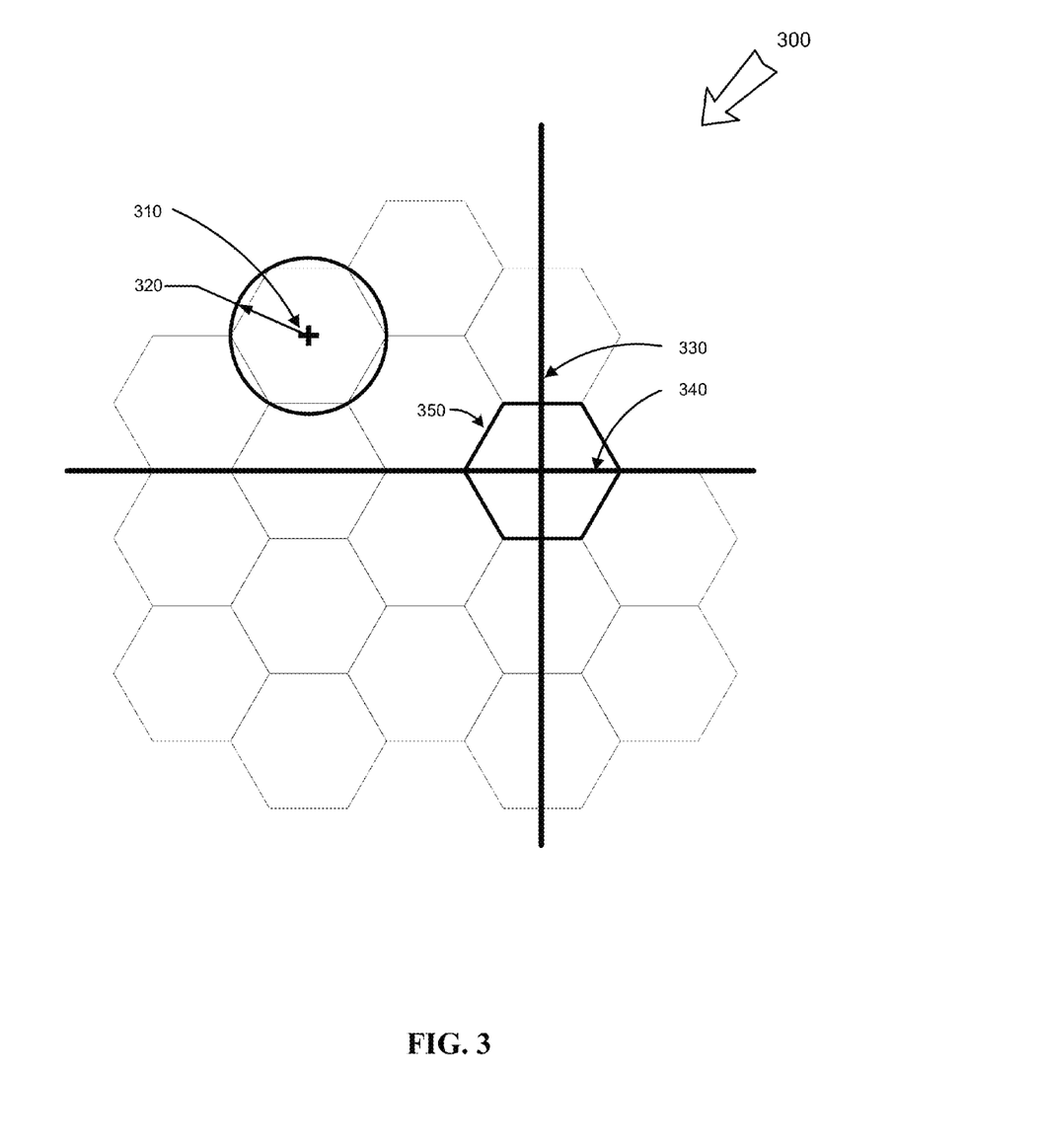
FIG. 3 illustrates how a geographic partitioning strategy may be established.

Referring to FIG. 3 a geographic partitioning strategy may be specified where each partitioned area may represent a discrete geographic region in which non-incumbent spectrum availability may be independently administered. The partitioning strategy may be established on an ad-hoc or predetermined basis. The geographic partitioning strategy is intended to enable communication between a ESC and SAS of the various geographic regions and their respective status as it relates to the protection of a non-informing IU.

In the illustrated example and preferred embodiment 300 a offset cellular grid is established where a single ESC Service Area (SA) is specified by a geographic coordinate 310 and a radial distance 320. In a preferred embodiment the SA grid may be anchored to, calculated against, and referenced from an originating SA 350 that is centered upon a fixed geographic reference point such as, for example, a line of longitude 330 and latitude 340. Other geographic partitioning strategies, addressing schemes and coordinate systems may also be used, such as, for example, a square grid, cube coordinates, axial coordinates and offset coordinate from a specified ESC sensor position.

Figure 4:
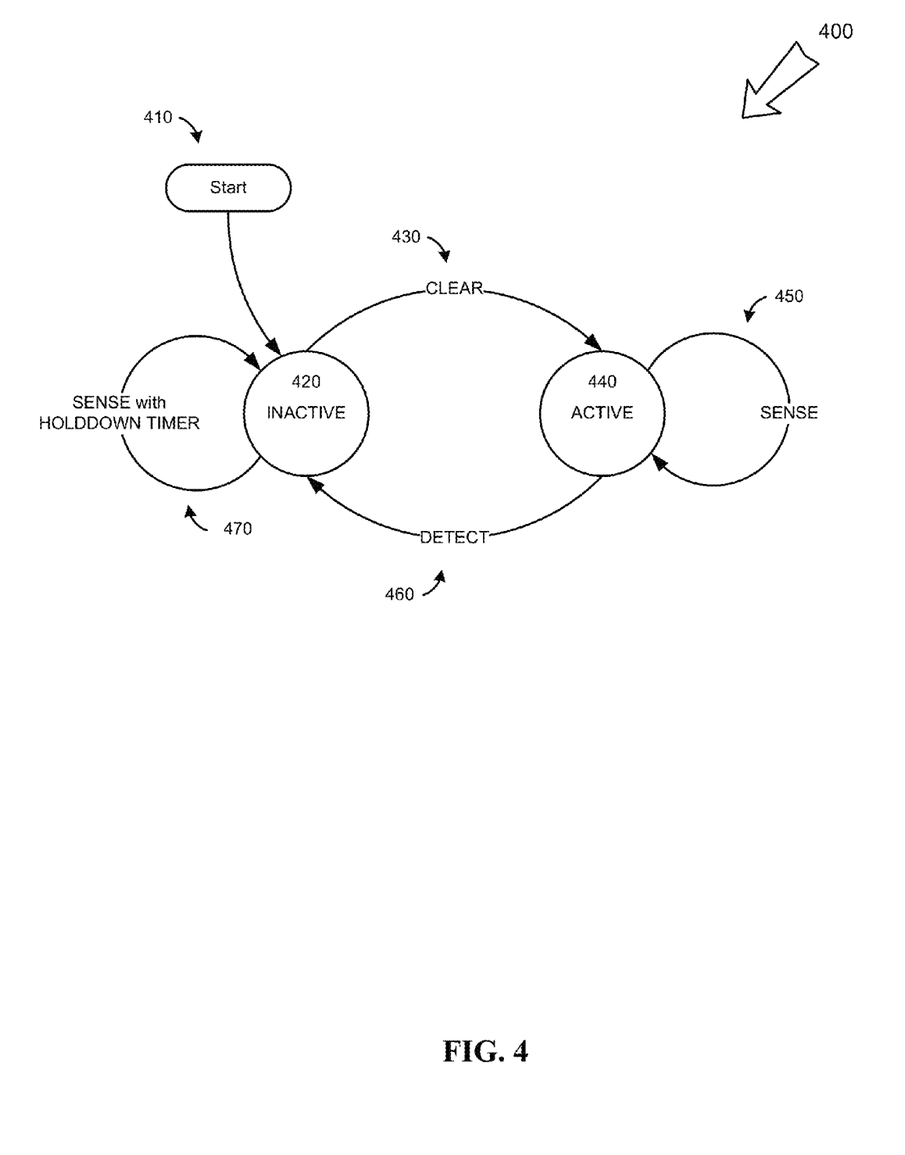
FIG. 4 depicts the finite state machine of a ESC service area.

As shown in FIG. 4 a finite state machine 400 may be assigned to each individual ESC Service Area (SA) created by the partitioning strategy 300. In a preferred embodiment the finite state machine includes of two possible states a SA may assume: ACTIVE, where non-incumbent spectrum operations may be enabled by the ESC (and consequently authorized by a SAS) within the geographic boundaries of the SA; and INACTIVE, where non-incumbent spectrum operations may be disabled by the ESC (and consequently prohibited by a SAS) within the geographic boundaries of the SA.

According to FIG. 4 the finite state machine is initialized 410 by first being made INACTIVE 420. Once a ESC SENSE process positively determines that no non-informing Incumbent User (IU) spectrum operations are present that affect the SA the ESC may trigger a CLEAR event 430 and transition the SA to a ACTIVE state 440. The SA may remain in a ACTIVE state indefinitely while the ESC implements a concurrent SENSE process 450 to detect non-informing IU spectrum operations that may affect the SA. If a non-informing IU spectrum operation is detected and is determined by the ESC to affect the SA a DETECT event may be triggered 460 and the SA may returned to a INACTIVE state 420 while a concurrent SENSE process may monitor the detected IU spectrum operation 470.

Optionally, when a DETECT event is triggered 460 and the SA is transitioned to a INACTIVE state 460, 420 a HOLDDOWN TIMER of configurable duration may be concurrently triggered by the ESC and the SA may then be kept in a INACTIVE state 420 until the HOLDDOWN TIMER has expired 470 and the SENSE process again positively determines that no IU spectrum operations affect the SA.

Figure 5:
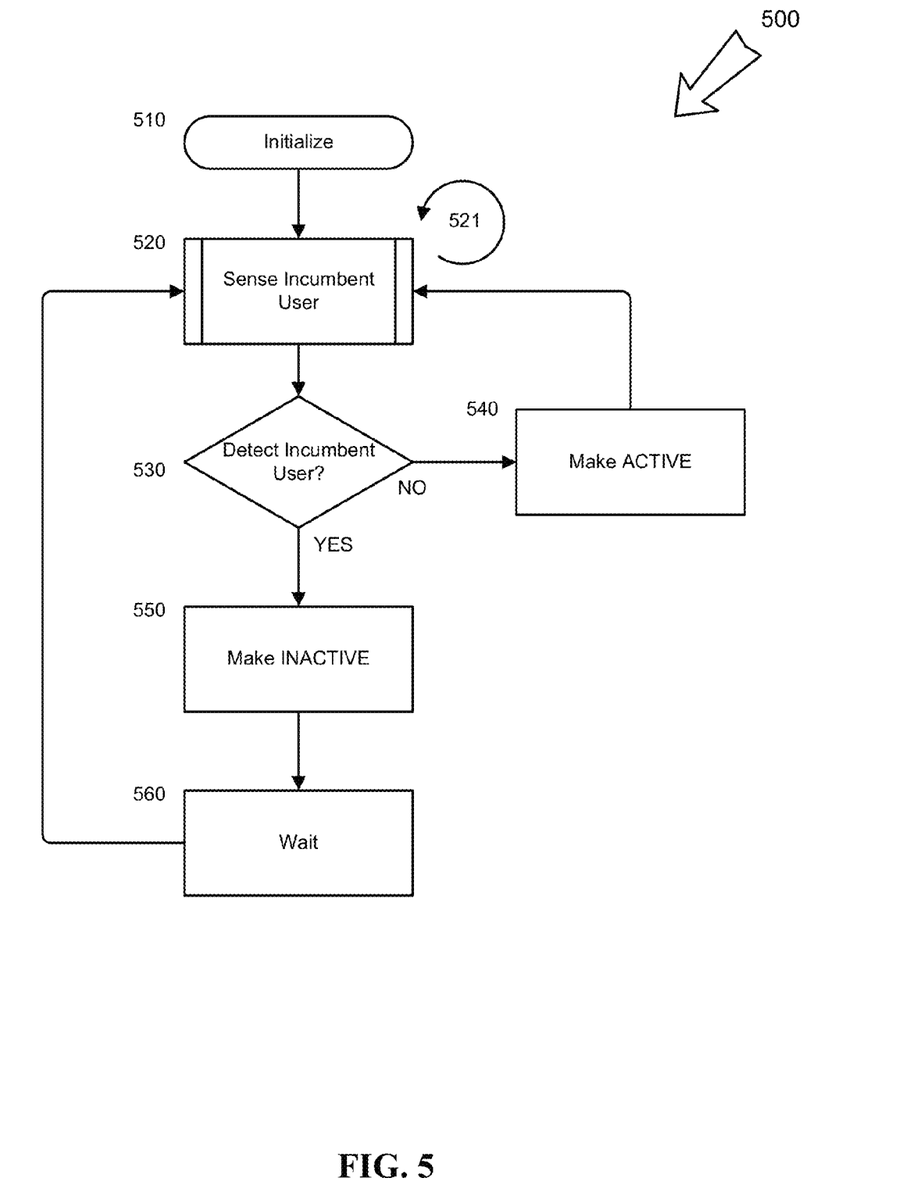
FIG. 5 is a flow diagram and process for administering a ESC service area finite state machine.

FIG. 5. illustrates the finite state machine 400 in flow chart form. The finite state machine process 500 initializes 510 and waits for a non-informing Incumbent User (IU) sensing process 520 to complete. If no IU is detected 530 that affects the SA the SA may be made ACTIVE 540 and sensing may continue indefinitely 520, 521. If a IU is detected 530 that affects the SA the SA may be made INACTIVE 550 and may be forced to wait an a INACTIVE state while a HOLDDOWN TIMER is allowed to expire 560, after which sensing may continue 520, 521.

Figure 6:
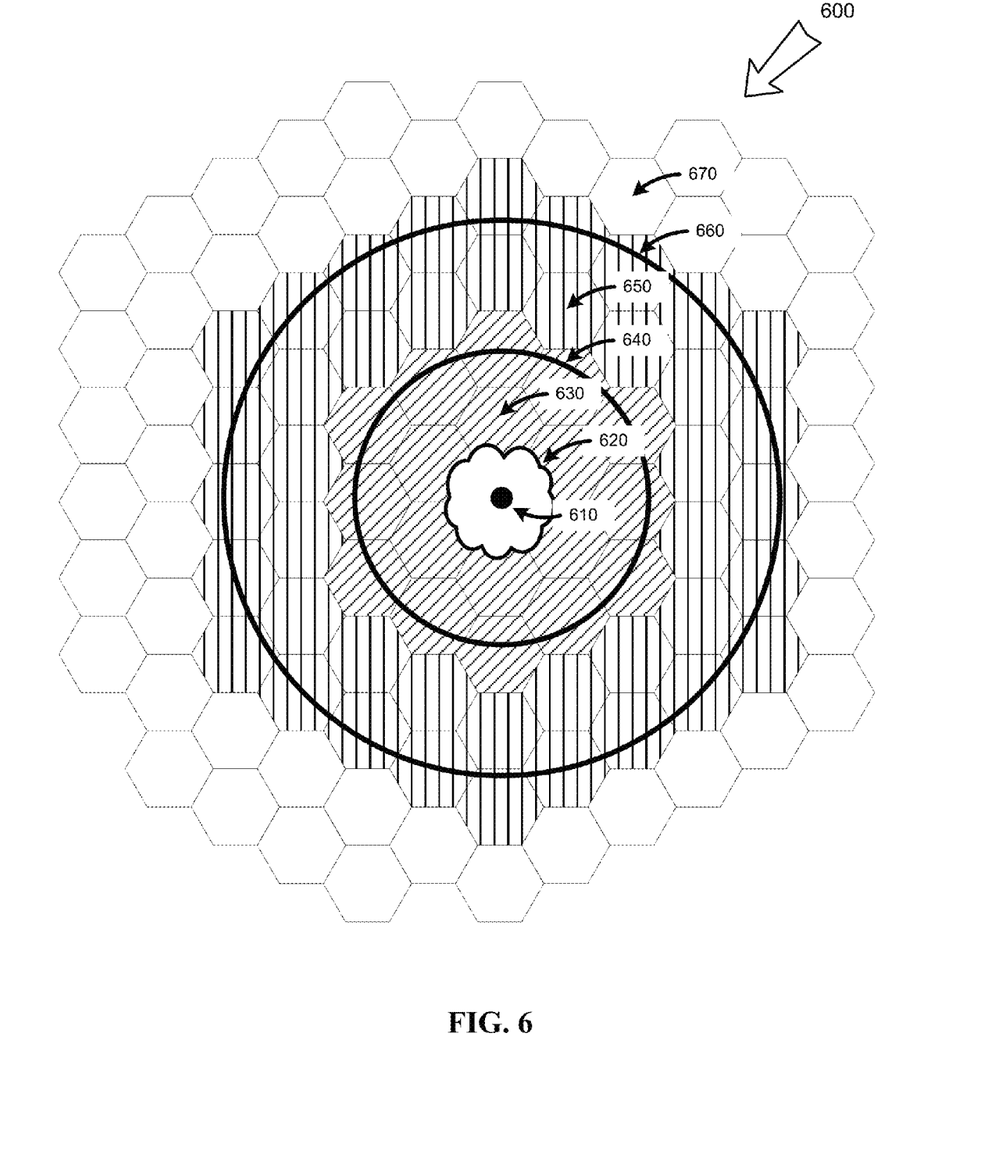
FIG. 6 describes possible geographies of a non-informing incumbent user protected contour and how those geographies may affect a plurality of ESC service areas.

Referring to FIG. 6 a geographic exclusion zone 660 may be established around a geo-located non-informing Incumbent User (IU) 610 to implement a geographic protection strategy within a ESC. The method 600 depends upon determining the geographic position of a non-informing IU 610. The empirical accuracy of geolocation determination may vary from time to time and a estimated region of confidence 620 may instead be used in place of a single position. The IU position and region of confidence are hereafter referred to interchangeably as the IU's geolocation 610, 620.

In a preferred embodiment a geographic protected contour 660 may be calculated around the IU geolocation 610, 620 and any ESC Service Area (SA) 630, 650 that is either intersected by or contained within the protected contour 660 may be made INACTIVE while those SA 670 not intersected by or contained within a contour may be made ACTIVE.

A plurality of geographic protected contours may be established around the IU geolocation 610, 620 and handled by the ESC according to various strategies. According to an envisioned embodiment a large 660 and a small 640 geographic protected contour may be concurrently calculated around a IU geolocation 610, 620 and a different ESC policy may be applied to each. For example, in an envisioned embodiment any SA intersecting or contained within both the larger and smaller contours 650, 630 may be made INACTIVE while also any SA 650 intersecting or contained within a larger contour 660 and not intersecting or contained within the smaller contour 640 may be handled according to a more relaxed configuration such as, for example, having a shorter HOLDDOWN TIMER duration.

In a preferred embodiment the established IU protected contour may be a polygon of fixed radius drawn around the IU location. However the actual IU protected contour geometry may be calculated and configured according to a variety of techniques and inputs that may include, for example, the declared preferences of the incumbent, the nature and detail of the detected spectrum operation, non-incumbent use factors such as aggregate interference, etc.

Figure 7:
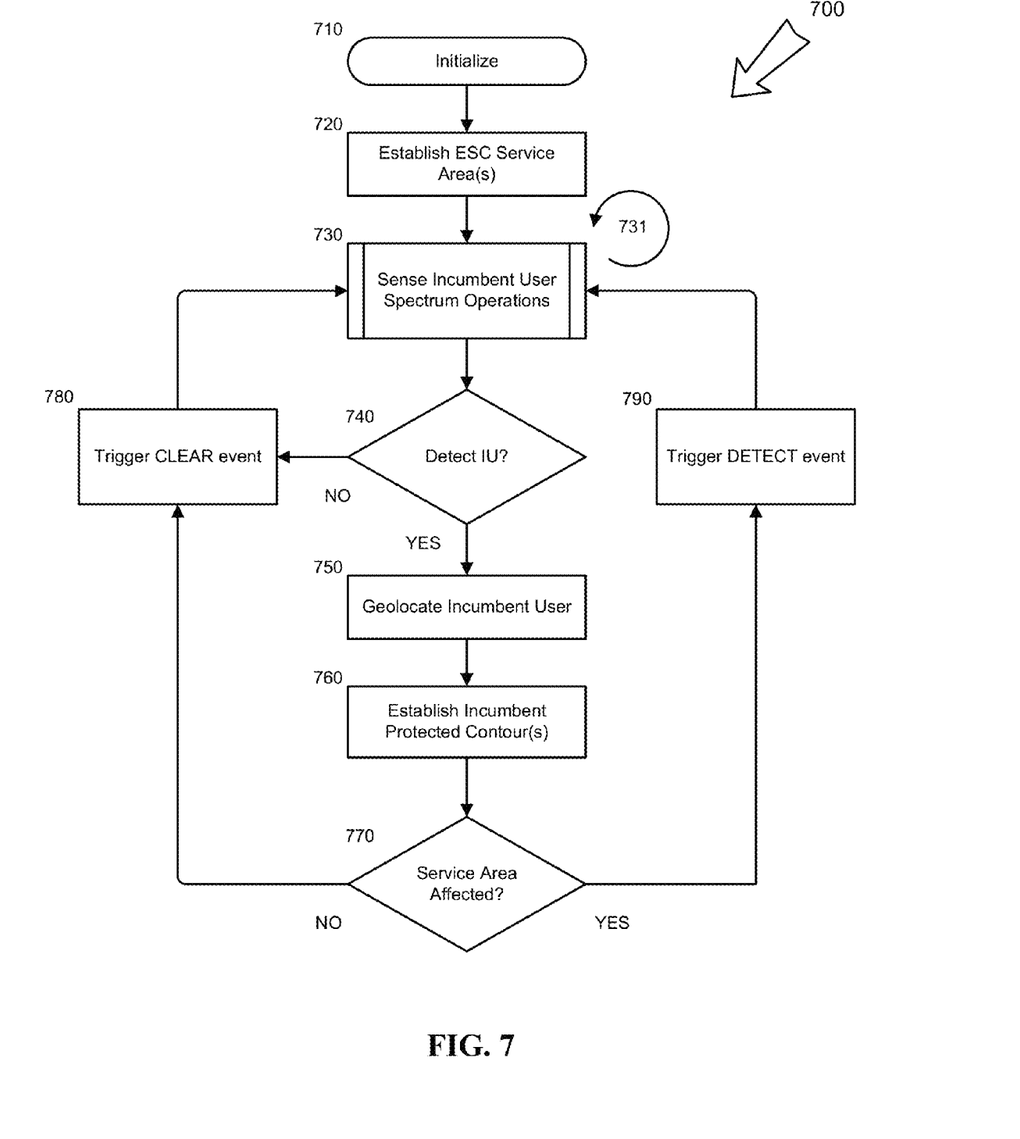
FIG. 7 is a flow diagram and process of the functions of a ESC.

FIG. 7 illustrates how a ESC preferred embodiment may employ the SA finite state machine 400 to implement a non-informing Incumbent User (IU) protection strategy. The process 700 is described in conjunction with elements of FIG. 2, FIG. 3, FIG. 4, FIG. 5 and FIG. 6 and includes: Starting with ESC initialization 710 a geographic partitioning strategy is implemented 720 according to the described processes 300, 400, 500. A plurality of ESC Sensors 200 may then begin to sense IU spectrum operations 730 within their respective effective ranges. This sense process may continue indefinitely 731.

If no IU is detected the ESC may trigger a CLEAR event 780 for a plurality of ESC Service Area (SA) and cause them each to be made ACTIVE. It should be noted that a redundant CLEAR event need not be triggered for SA already in the ACTIVE state. This logic check is obvious to one skilled in the art and has been omitted from the illustrated process 700 for clarity.

When a IU is detected 740 the ESC may attempt to geolocate the IU 750 and, if successful, the ESC may establish a geographic protected contour around the IU's position 760 according to previously described methods 600. The ESC may then determine if the established IU geographic protected contour affects any SA 770 according to previously described methods 600 and either cause the SAS to protect the IU within the affected SA by triggering a DETECT event 790 or cause the SAS to authorize or continue to authorize non-incumbent spectrum operations in the SA by triggering a CLEAR event 780. As before it should be noted that a redundant DETECT or CLEAR event need not be triggered for SA already in the INACTIVE or ACTIVE state, respectively. This logic check is also obvious to one skilled in the art and has been omitted from the illustrated process 700 for clarity.

Figure 8:
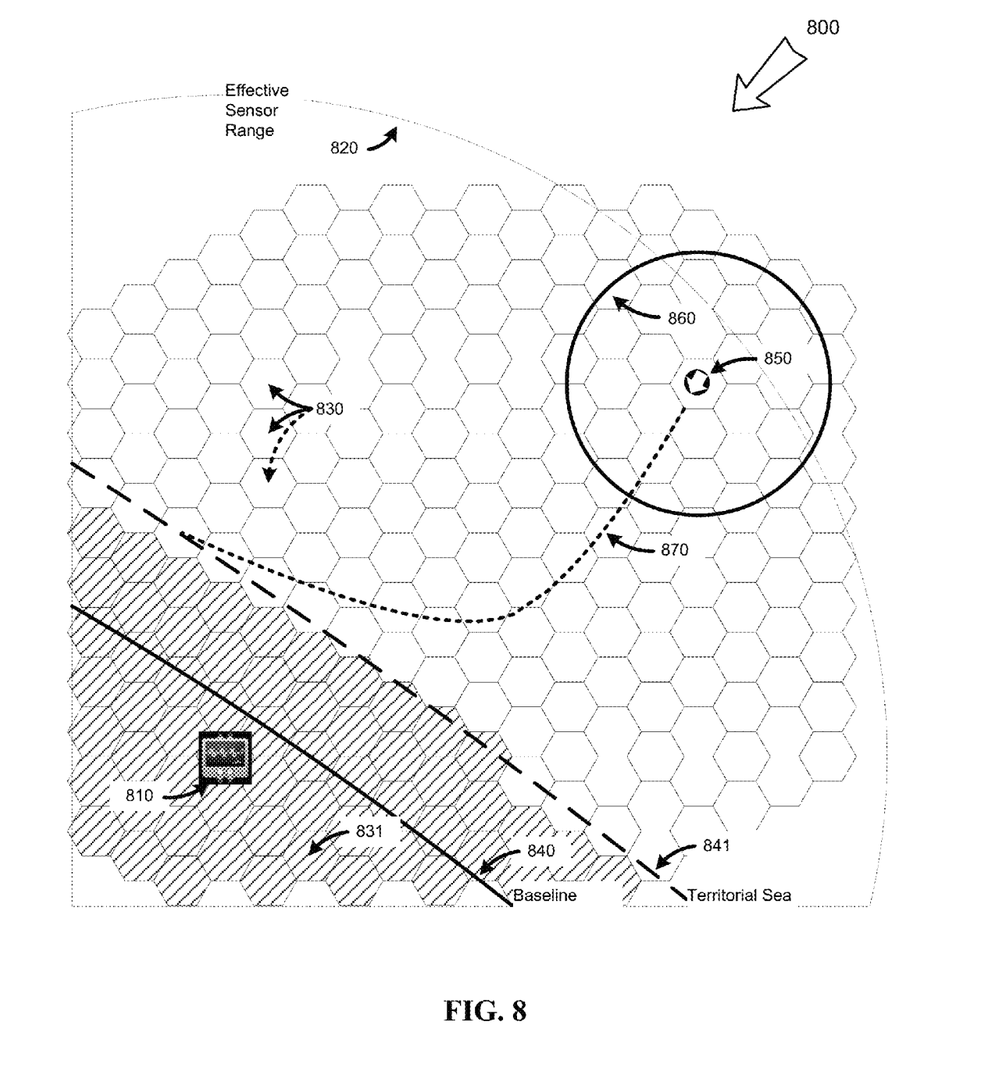
FIG. 8, FIG. 9 and FIG. 10 together illustrate a sequence of scenarios showing how a non-informing incumbent user may affect a plurality of ESC service areas and cause those areas to be made unavailable for non-incumbent use.
Figure 9:
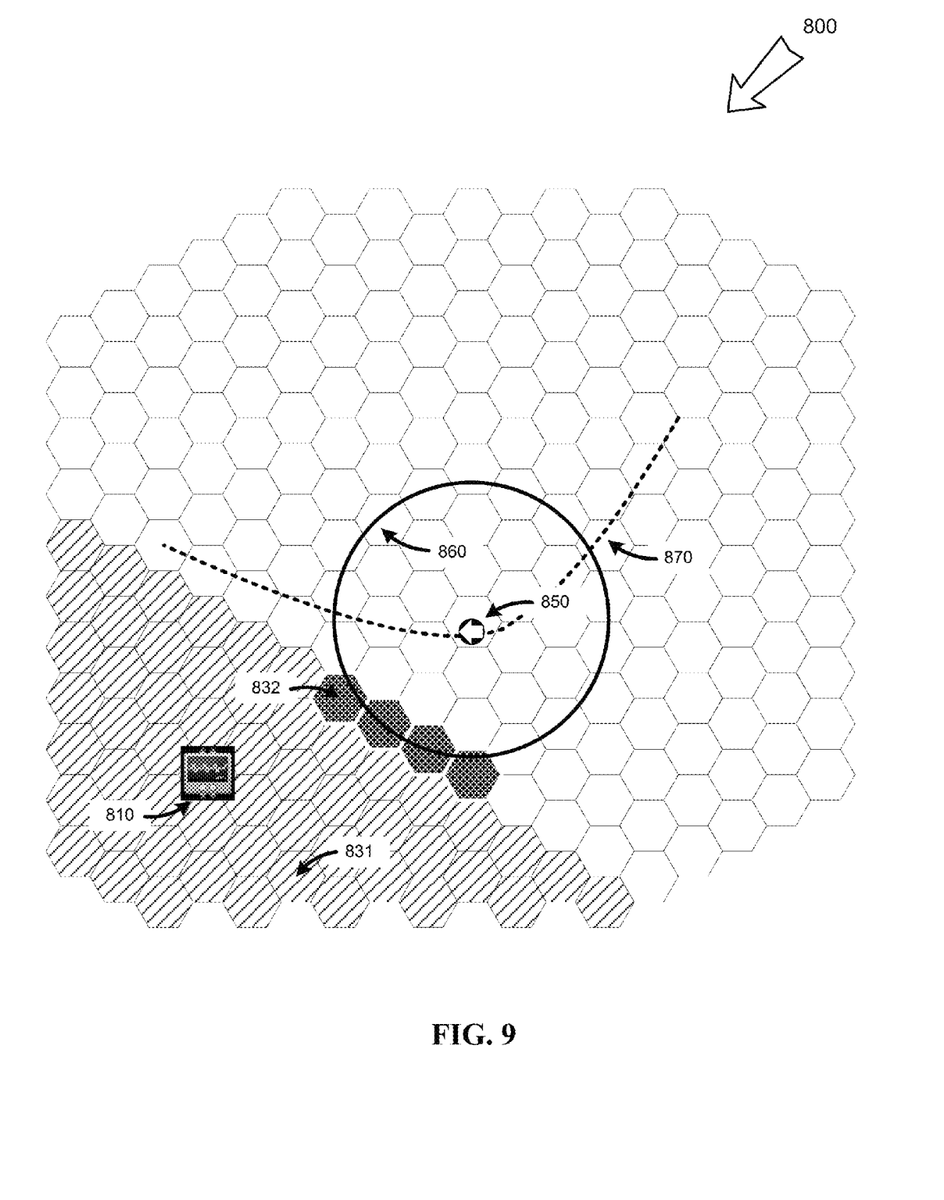
Figure 10:
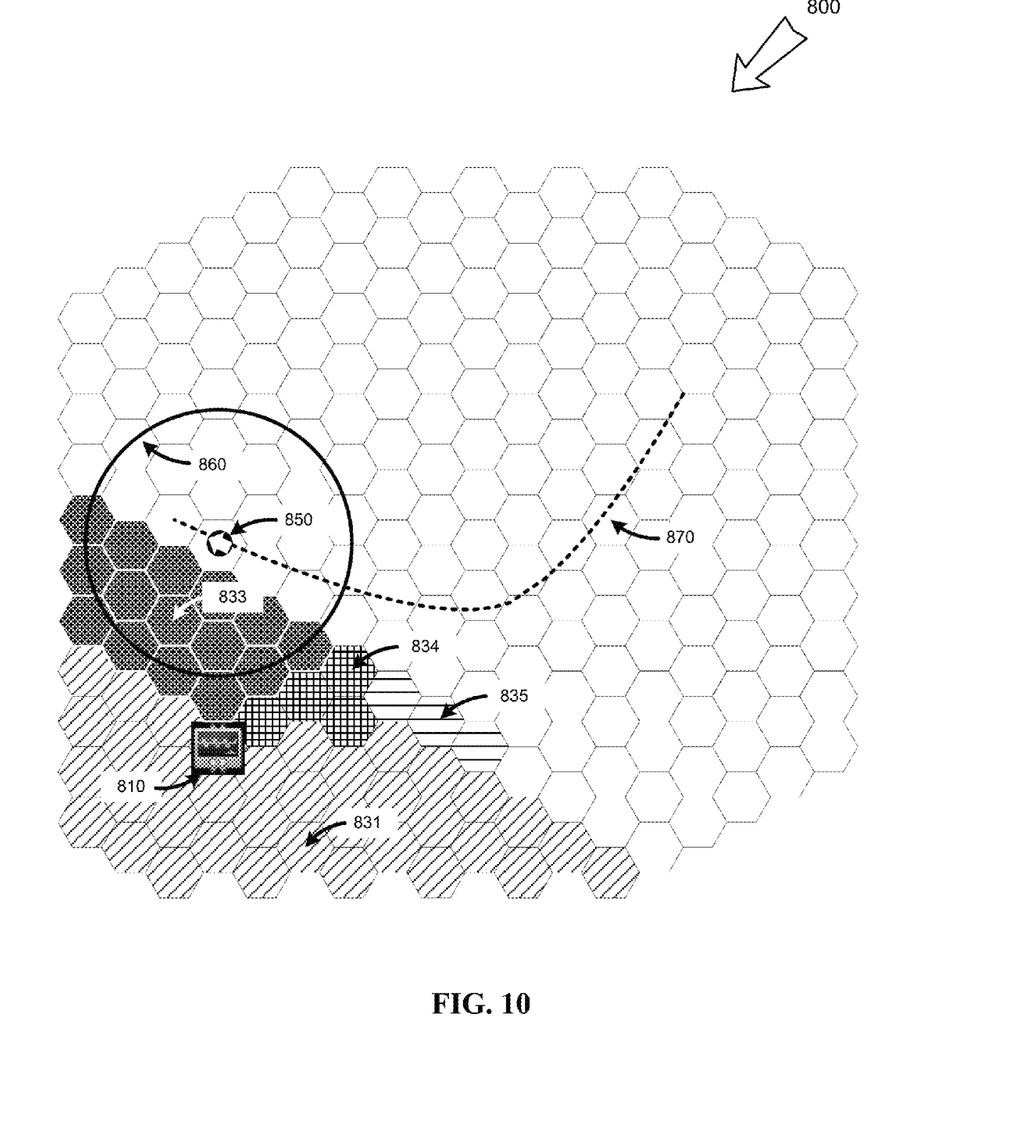

Together FIG. 8, FIG. 9 and FIG. 10 illustrate a method for protecting the spectrum operations of a non-informing Incumbent User (IU) according to a preferred embodiment of the immediate invention wherein a plurality of ESC sensors is employed. For clarity only one is shown and described in the provided example. The method 800, which is described in conjunction with elements of FIG. 9 and FIG. 10, includes a ESC (not shown) that has been initialized and is operating according to the previously described process 700 with a geographic partitioning strategy 830 and a ESC Sensor 810.

In FIG. 8 the ESC Sensor 810 has established service availability for a plurality of ESC Service Areas (SA) 831 within its effective sensor range 820, which extends beyond the coastal Baseline 840 and includes the Territorial Sea 841.

The method 800 further includes a IU 850 that has entered the ESC Sensor's effective range 820 and been detected and geo-located by the ESC Sensor 810. According to the described method and procedure 600, 700 a geographic protected contour 860 has been established around the IU 850.

According to a preferred embodiment a IU protected contour may affect a SA when the SA is intersected by or contained within the protected contour. Accordingly, in FIG. 8 the various SA 831 under ESC administration have been made AVAILABLE according to the previously described processes 500, 700.

To further explain the method 800 the IU will be made to move along a path 870 and its effect analyzed at different placements. Additionally, to clarify the method's explanation in FIG. 9 and FIG. 10 the ESC Sensor effective range 820, the Baseline 840 and the Territorial Sea 841 are omitted from subsequent illustrations but are assumed to be present. It should be noted that while the IU marker 850 includes an arrow the IU's immediate direction of motion is not required and may not be known to the ESC and that the arrow is included only to clarify the illustration.

Referring to FIG. 9 the IU 850 is moved along the path 870 to a geolocation closer to the Territorial Sea 841 and the IU protected contour 860 has been determined by the ESC to affect several SA 832 and those several SA have been made INACTIVE by the ESC. All other SA 831 may remain unaffected by the IU 850.

In the described scenario and also according to a preferred embodiment the ESC may communicate to a SAS the immediate state or the state change information of each of the several SA 832 without disclosing information about the detected IU spectrum operations.

In FIG. 10 the IU is further continued along the path 870 and the IU protected contour 860 has been determined by the ESC to immediately affect a different set of SA 833 that have been made INACTIVE. Another collection of SA 834 are no longer affected by the IU protected contour 860 but continue to be made INACTIVE by the ESC because their respective HOLDDOWN TIMERs have not yet expired. Also in FIG. 10 a third collection of SA 835 has been returned to ACTIVE status because its HOLDDOWN TIMER has expired and the SA 835 are also no longer affected by the IU protected contour 860.

As before, in a preferred embodiment the ESC may communicate to a SAS the immediate state or the state change information of each of the various SA without disclosing information about the IU spectrum operations.

It is now appreciated how a ESC, working in conjunction with a SAS, may protect non-informing IU spectrum operations without disclosing information about the detected spectrum operations. According to the described method and procedure a ESC is responsible to determine how to protect a non-informing IU from non-incumbent RFI while a SAS is responsible to implement the actual protection. The described method does not disclose detailed information about the detected non-informing IU spectrum operations and may be useful in circumstances where the IU does not or may not inform the SAS about its spectrum operations, and where information about the IU may be considered protected or non-public or subject to information security constraints.

It should also be appreciated that embodiments of the present invention may include apparatuses and/or devices for performing the operations herein. An apparatus may be specially constructed for the desired purposes, or it may comprise a general purpose device selectively activated or reconfigured by a program stored in the device. Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, an exemplary machine-readable storage medium may include, e.g., but not limited to, read only memory (ROM); random access memory (RAM); magnetic disk storage media; optical storage media; magneto-optical storage media; flash memory devices; etc.

Although a variety of examples and other information was used to explain aspects within the scope of the appended claims no limitation of the claims should be implied based on particular features or arrangements in such examples as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

A variety of implementations of the invention have been described. Nevertheless it is expected that various modifications may be introduced without departing from the spirit and scope of the invention. For example, the ESC functionality may be incorporated within a SAS; or the information communicated between the ESC and SAS may be more or less comprehensive, or the ESC sensor and geo-location capabilities may be decoupled. Accordingly, other embodiments are within the scope of the following claims.

The invention claimed is:

1. A system for protecting a non-informing incumbent spectrum user, comprising a spectrum access system and an environmental sensing capability; where
   a) responsibility to establish radio frequency interference protection for the non informing incumbent spectrum user is assigned to the environmental sensing capability; and
   b) responsibility to implement radio frequency interference protection for the non informing incumbent spectrum user is assigned to the spectrum access system; and
   c) the environmental sensing capability is comprised of:
   i) An application configured to:
      1) establish a geographic partitioning strategy wherein an ordered arrangement of service areas is defined;
      2) establish and maintain a finite state machine status of each service area defined by the geographic partitioning strategy;
      3) communicate an immediate status and/or immediate change event of the various finite state machines to a spectrum access system;
   ii) At least one or more spectrum sensing devices;
   iii) An application that receives information from one or more spectrum sensing devices, the application being configured to process the received information and to discern from the received information the presence or absence of a radio frequency emission from the non-informing incumbent spectrum user;
   iv) the application that receives information from the one or more spectrum sensing devices, the application being configured to process the received information and to geo-locate a position or approximate position of a detected non-informing incumbent spectrum user;
   v) the application configured to:
      1) establish the geographic protected contour around the position or approximate position of the detected non-informing incumbent spectrum user;
      2) perform a geometric calculation that incorporates the established geographic protected contour
      3) optionally adjust a result of the geometric calculation according to a plurality of spectrum sharing policy rules;
      4) cause the finite state machine of the various service areas to be changed according to the results of the geometric calculation and plurality of spectrum sharing policy rules.

2. The system of claim 1, where the result of the geometric calculation is adjusted according to a hold down timer.

3. The system of claim 1, where the result of the geometric calculation is adjusted to include the aggregate interference of the various non-incumbent spectrum users contained within reach respective service area, the aggregate interference value being either a calculated estimate or empirically measured.

4. The system of claim 1, where a messaging protocol is employed to communicate the immediate state and/or the state transition information of the various service areas defined by the geographic partitioning strategy.

5. The system of claim 1, where the spectrum sensing devices are deployed to encircle a geographic region where non-informing incumbents are expected to operate and the spectrum sensing devices are configured such that their combined effective sensor ranges establish a continuous and uninterrupted sensing capability throughout the encircled geographic region.

6. The system of claim 1, where the spectrum sensing devices are deployed along a coastal region and configured such that their combined effective sensor ranges establish a continuous and uninterrupted sensing capability out to at least the Territorial Sea.

* * * * *